United States Patent [19]

Abe

[11] 4,208,653
[45] Jun. 17, 1980

[54] DATA COLLECTION APPARATUS
[75] Inventor: Takeshi Abe, Tokyo, Japan
[73] Assignee: Ricoh Company, Ltd., Tokyo, Japan
[21] Appl. No.: 889,920
[22] Filed: Mar. 24, 1978
[30] Foreign Application Priority Data Mar. 28, 1977 [JP] Japan ................................ 52-34270
Mar. 30, 1977 [JP] Japan ................................ 52-34653

[51] Int. Cl.² ........................ H04Q 9/06; G08C 19/36
[52] U.S. Cl. ................................... 340/151; 340/203;
340/210
[58] Field of Search .............. 340/150, 151, 152, 203,
340/207, 210, 172, 147 R

[56] References Cited

U.S. PATENT DOCUMENTS

| | | | |
|---|---|---|---|
| 3,417,390 | 12/1968 | Turtle | 340/210 |
| 3,659,277 | 4/1972 | Brown | 340/203 |
| 3,828,313 | 8/1974 | Schull et al. | 340/151 |
| 3,944,981 | 3/1976 | Akita et al. | 340/147 R |
| 4,001,703 | 1/1977 | Saul et al. | 340/210 |
| 4,070,650 | 1/1978 | Ohashi et al. | 340/172 |

Primary Examiner—Donald J. Yusko
Attorney, Agent, or Firm—David G. Alexander

[57] ABSTRACT

Remote stations are connected to utility meters in individual dwellings. A main station is connected to the remote stations via first, second and third transmission lines. The main station applies power and interrogation signals to a selected remote station over the first and third transmission lines. The selected remote station sends data signals representing the meter reading to the main station over the second and third transmission lines in response to the interrogation signals. The main station may further send secondary interrogation signals to the selected remote station by connecting and disconnecting the second and third transmission lines. The selected remote station sends secondary data signals to the main station over the second and third transmission lines in response to the secondary interrogation signals.

7 Claims, 7 Drawing Figures

DATA COLLECTION APPARATUS

BACKGROUND OF THE INVENTION

The present invention relates to a data collection apparatus for remote reading of utility meters and the like.

Due to the high personnel costs and possibility of error involved in manual reading of gas, water, electric and similar utility meters installed in individual homes, automatic systems have been developed which electrically read the meters via transmission lines. Such systems connect a main station located in the headquarters or branch of the utility company to the individual meters in the homes. It has been practiced in the art to embody the transmission lines as public telephone lines and provide the meters with means for responding to predetermined respective code signals applied to the telephone lines. In response to a code signal corresponding to itself, a particular meter will apply data signals to the telephone line representing the meter reading. The data signals are received by the main station and used to prepare the utility bill for the customer.

However, due to high costs and other problems, improved systems for remote reading of utility meters have been developed using separate transmission lines which are the property of the utility company. Such systems which have proven advantageous comprise three transmission lines which connect the remote stations to a main station. A remote station is provided to each utility meter and comprises an integrated three-wire motor counter. An electric motor drives the utility meter in dependence on the amount of utility consumed and opens and closes switch contacts which correspond to the meter reading.

A large number of these motor-counter units have been in service for such a long period of time that they must be replaced. Another important factor is the development of integrated meter units comprising electronic memory rather than mechanical counters, which are preferable from the view-points of economy of manufacture and reliability of operation. Rather than replace all of the motor-counter units at one time, it is preferable to gradually phase them out as they become unfit for service and replace them with the new electronic units. However, a remote data collection apparatus has not been proposed heretofore which can use the mechanical and electronic remote meter station units interchangeably.

SUMMARY OF THE INVENTION

The present invention overcomes the drawbacks of the prior art by providing a main station which is connected to remote stations by first, second and third transmission lines. A remote station is provided to each utility meter. The main station sends interrogation signals to a selected remote station over the first and third transmission lines in addition to operating power for the remote station. In response to the interrogation signals, the remote station sends data signals corresponding to the meter reading to the main station over the second and third transmission lines. In one form of the invention, the main station comprises switch means to connect and disconnect the second and third transmission lines and thereby feed secondary interrogation signals to the remote station. In response to the secondary interrogation signals, the remote station sends secondary data signals to the main station over the second and third transmission lines. The latter embodiment is especially advantageous for an integrated meter which measures the consumption of two utilities such as gas and electricity.

It is an object of the present invention to provide a remote data collection apparatus which is reliable in operation and economical to manufacture and install in commercial application.

It is another object of the present invention to provide a remote data collection apparatus which reduces power requirements for remote stations since the power required for data transmission is applied only during the actual data transmission.

It is another object of the present invention to provide a remote data collection apparatus which can use mechanical and electronic meter units interchangeably.

It is another object of the present invention to provide a generally improved remote data collection apparatus.

Other objects, together with the foregoing, are attained in the embodiments described in the following description and illustrated in the accompanying drawing.

BRIEF DESCRIPTION OF THE DRAWING

FIG. 4 is a diagram illustrating how FIGS. 4a to 4c are juxtaposed to constitute a complete timing diagram;

FIGS. 4a to 4c in combination constitute a timing diagram illustrating the operation of the embodiment of FIGS. 1 and 2.

DESCRIPTION OF THE PREFERRED EMBODIMENTS

While the remote data collection apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
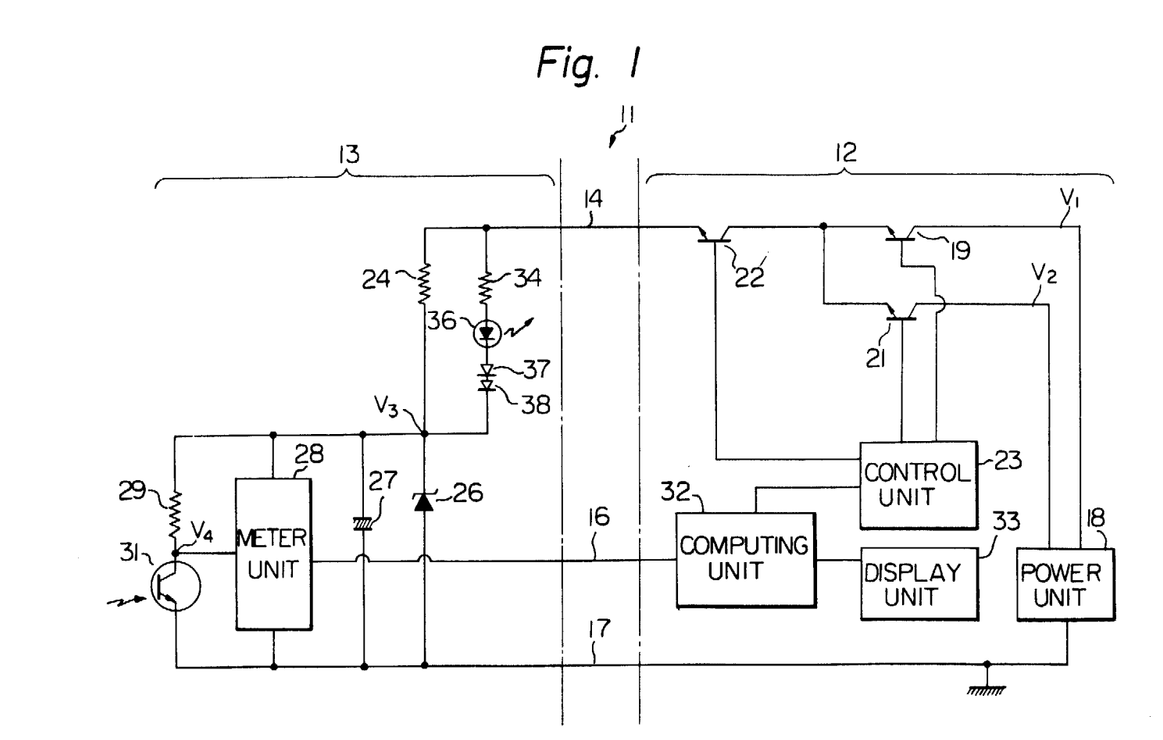
FIG. 1 is an electrical schematic diagram, partially in block form, of a remote data collection apparatus embodying the present invention.

Referring now to FIG. 1, a remote data collection apparatus embodying the present invention is generally designated by the reference numeral 11 and comprises a main station 12 and a remote station 13. In a practical system, a large number of remote stations 13 are provided to respective utility meters in individual homes or businesses, although only one remote station 13 is shown for simplicity of illustration. Means for addressing a particular remote station 13 from the main station 12 are not the subject matter of the present invention and are not shown.

The main station 12 is connected to the remote station 13 through first, second and third transmission lines 14, 16 and 17 respectively. The third transmission line 17 is a common line and is grounded. The main station 12 comprises a power supply unit 18 which applies positive D.C. voltages V1 and V2 to the collectors of NPN transistors 19 and 21 respectively. The emitters of the transistors 19 and 21 are connected to the collector of an NPN transistor 22 which serves an on-off function. The emitter of the transistor 22 is connected to the first transmission line 14. A control unit 23 is connected to the bases of the transistors 19, 21 and 22 in a manner which will become evident from further description below.

The remote station 13 comprises a resistor 24 and a zener diode 26 which are connected in series between the first and third transmission lines 14 and 17 to constitute a shunt voltage regulator. A filter capacitor 27 is connected across the zener diode 26. The zener voltage of the zener diode 26 is selected to be lower than the voltages V1 and V2 and is designated as V3. Preferably, the voltage V1 is greater than the voltage V2, the voltage V2 being slightly higher than the voltage V3. The voltage V3 constitutes a power supply voltage for the remote station 13, which is required only during data transmission.

The remote station 13 comprises a meter unit 28 which utilizes a local power source (not shown) to measure the consumption of a utility such as gas, electricity, water and the like, and is connected across the zener diode 26. A resistor 29 is connected in series with an NPN phototransistor 31 across the zener diode 26, with the junction of the resistor 29 and phototransistor 31 being connected to the meter unit 28. The output of the meter unit 28 is connected through the second transmission line 16 to a computing unit 32 at the main station 12. Outputs of the computing unit 32 are connected to the control unit 23 and to a display unit 33 such as a cathode ray tube, printer or the like.

A resistor 34, light emitting diode (LED) 36 and voltage dropping diodes 37 and 38 are connected in series across the resistor 24. The LED 36 is optically coupled to the phototransistor 31 to constitute an optocoupler (not designated).

In operation, the control unit 23 applies a high voltage to the base of the transistor 22 turning the same on. Then, the control unit 23 alternatingly applies high voltages to the bases of the transistors 19 and 21 to turn the same on. As a result, the voltages V1 and V2 are alternatingly applied to the first transmission line 14 to constitute interrogation pulses. Since the voltages V1 and V2 are higher than the voltage V3, the supply voltage across the zener diode 26 is continuously available to power the remote station 13. However, the LED 36 only emits light when the higher voltage V1 is present on the line 14. The phototransistor 31 is turned on by the light emitted from the LED 36 so that a substantially zero voltage developed at the collector of the phototransistor 31 is applied to the meter unit 28. When the voltage V2 is applied to the line 14, the LED 36 does not emit light, the phototransistor 31 is turned off and substantially the voltage V3 is applied to the meter unit 28.

Thus, pulse signals varying between zero and V3 are applied to the meter unit 28 when the voltages V1 and V2 respectively are applied to the line 14.

In response to the pulses, the meter unit 28 applies data pulse signals representing the meter reading through the second transmission line 16 to the computing unit 32 which reconstructs the meter reading from the data pulses. The meter reading is fed from the computing unit 32 to the display unit 33 to indicate the meter reading to the operator of the main station 12.

It will be understood that the power supply voltage for the remote station 13 and the interrogation signals are fed from the main station 12 to the remote station 13 over the first and third transmission lines 14 and 17 respectively. In response to the interrogation signals, the remote station 13 feeds the data signals representing the meter reading to the main station 12 over the second the third transmission lines 16 and 17 respectively.

Figure 2:
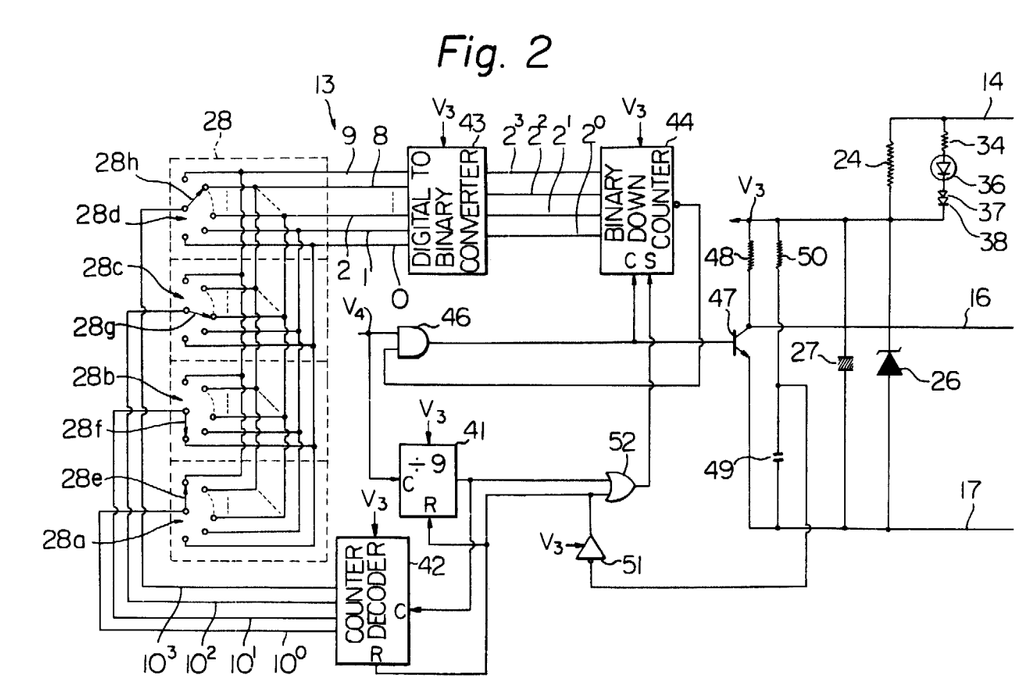
FIG. 2 is a more detailed schematic diagram of the present apparatus.

The remote station 13 is shown in greater detail in FIG. 2, and comprises a divide-by-nine counter 41 having an output connected to a count input of a two-bit counter-decoder 42 which produces high outputs on lines designated as $10^0$, $10^1$, $10^2$ and $10^3$ in response to counts of 00, 01, 10 and 11 therein respectively.

The meter unit 28 is shown as comprising four, ten-position switches 28a, 28b, 28c and 28d which correspond to the units ($10^0$), tens ($10^1$), hundreds ($10^2$) and thousands ($10^3$) place digits of the meter reading. The meter unit 28 thus provides a four place meter reading with a maximum value of 9999.

The switches 28a to 28d comprises movable contacts 28e to 28h which are connected to the lines $10^0$ to $10^3$ respectively. The contacts 28e to 28h are driven by a motor unit (not shown) in accordance with the amount of utility consumed. Each of the switches 28a to 28d comprises ten fixed contacts with which the movable contacts 28e to 28h respectively are engageable. Although the ten contacts are not labeled to avoid cluttering of the drawing, they correspond to the values 0 to 9 of the respective digit of the meter reading.

The fixed contacts of all of the switches 28a to 28d corresponding to the value zero are connected through a line designated as 0 to a digital-to-binary converter 43. Similarly, the contacts of all of the switches 28a to 28d corresponding to values of one through nine are connected through lines designated as 1 to 9 to the converter 43.

Although not shown, the movable contacts 28e to 28h are connected together through progressive 10:1 reduction gears. In other words, for each complete rotation of the movable contact 28e in which it successively contacts the ten fixed contacts of the switch 28a, the movable contact 28f of the switch 28b is rotated through 1/10 rotation, etc. The switch unit 28 is a four digit decimal counter.

The converter 43 has four binary outputs designated as $2^0$, $2^1$, $2^2$ and $2^3$ which are connected to a four-bit binary down-counter 44. The binary equivalent of the 0 to 9 inputs of the converter 43 appears on the outputs $2^0$ to $2^3$. An output of the counter 44 which is logically low only when the count in the counter 44 is zero is connected to an input of an AND gate 46, another input of which is connected to the collector of the phototransistor 31. The collector voltage of the phototransistor 31 is designated as V4.

The output of the AND gate 46 is connected to the base of an NPN transistor 47, the emitter of which is connected to the line 17. The collector of the transistor 47 is connected directly to the line 16 and through a resistor 48 to the junction of the resistor 24 and zener diode 26 to receive the voltage V3. A resistor 50 and capacitor 49 are connected in series across the zener diode 26. The junction of the resistor 50 and capacitor 49 is connected to the input of an inverter 51, the output of which is connected to an input of an OR gate 52 and reset inputs of the counter 41 and counter-decoder 42. The output of the OR gate 52 is connected to a set input of the counter 44. An output of the counter 41 is connected to another input of the OR gate 52. The output of the AND gate 46 is connected to a count-down input of the counter 44. The voltage V4 from the collector of the phototransistor 31 is also applied to a count input of the counter 41.

Figures 4, 4A:
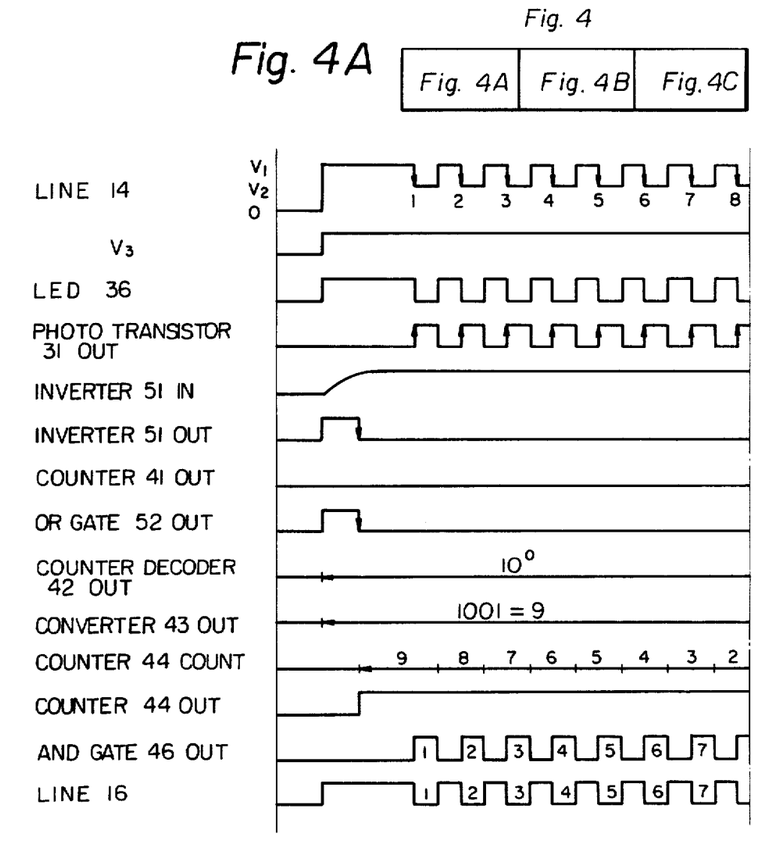
Figure 4B:
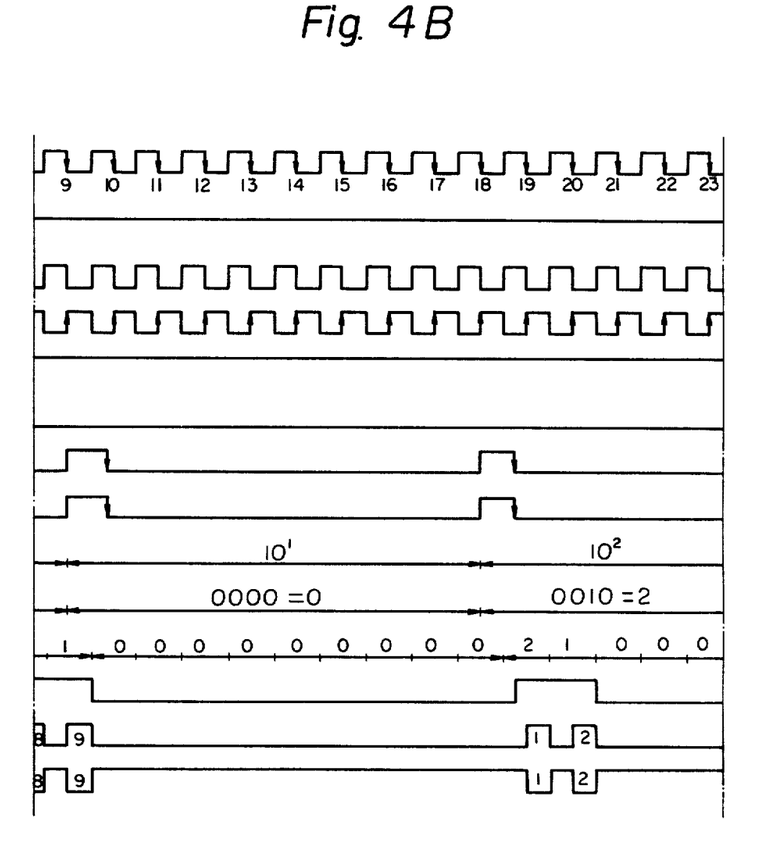
Figure 4C:
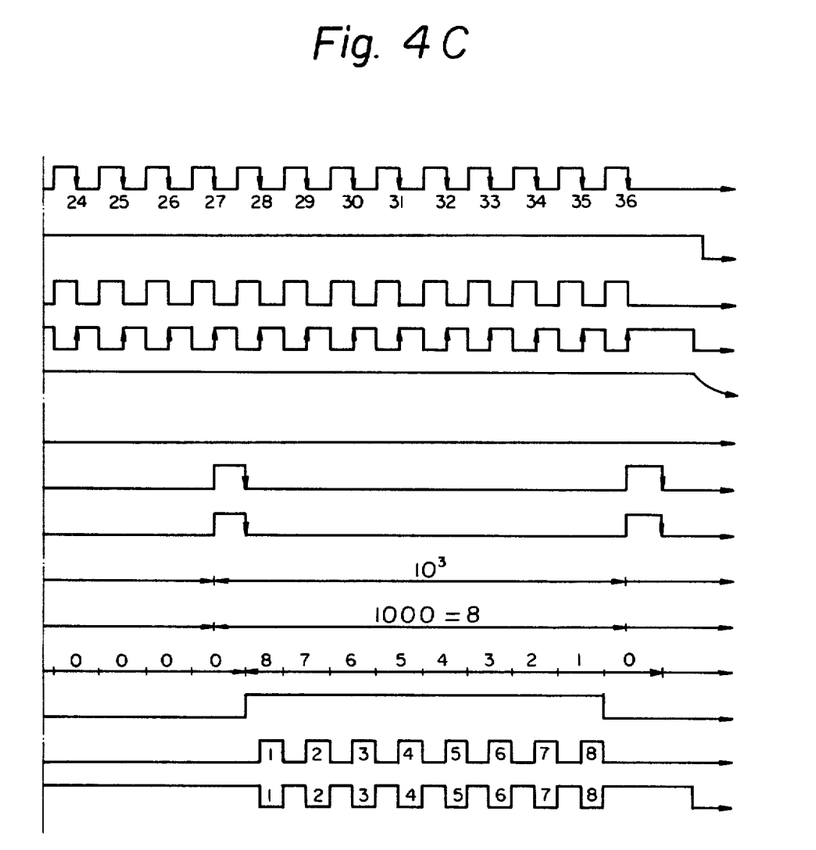

In operation, as shown in FIGS. 4a to 4c, the control unit 23 of the main station 12 initially applies high signals to the bases of the transistors 19 and 22 to turn on the same. Thus, the voltage V1 is applied to the line 14 causing the LED 36 to emit light and the collector voltage V4 of the phototransistor 31 to go to zero. The voltage V3 across the zener diode 26 causes the capacitor 49 to charge through the resistor 48. At the instant of application of the voltage V3, the voltage across the capacitor 49 is zero. However, this voltage increases exponentially as the capacitor 49 charges. Thus, the input to the inverter 51 goes from low to high.

At the instant of application of the voltage V3, the inverter 51 produces a high output. However, the rising voltage across the capacitor 49 causes the output of the inverter 51 to go from high to low. This falling signal is applied to the reset inputs of the counter 41 and counter-decoder 42 causing the same to be reset to counts of zero.

The falling output signal of the inverter 51 is also applied through the OR gate 52 to the set input of the counter 44 causing the signals on the lines $2^0$ to $2^3$ to be set into the respective stages of the counter 44.

The zero count in the counter 42 produces a high output on the line $10^0$, which is applied to the movable contact 28e of the units digit switch 28a. In the illustrated example, the movable contact 28e is in engagement with the fixed contact of the switch 28a connected to the line 9, indicating that the units place digit of the meter reading is nine. The high output on the line $10^0$ is applied through the movable contact 28e through the fixed contact corresponding to nine of the switch 28a and the line 9 to the converter 43 which produces high, low, low and high outputs on the lines $2^0$ to $2^3$ respectively (decimal 9=binary 1001). The value 1001 is set into the counter 44 upon receipt of the falling signal from the OR gate 52. It will be noted that the capacitor 49 and resistor 50 constitute an integrating circuit which produces a slight delay, thereby insuring proper sequential operation of the counter 44.

Then, the control unit 23 removes the high signal from the base of the transistor 19 and applies a high signal to the base of the transistor 21. The lower voltage V2 is thereby applied to the line 14. Such transitions from V1 to V2 produce interrogation pulses. The voltage V2 causes the LED 36 to be extinguished and the phototransistor 31 to produce a high collector voltage. This voltage V4 is applied through the AND gate 46 to the counter 44 causing the counter 44 to decrement. The high output of the AND gate 46 turns on the transistor 47 so that the low collector voltage thereof is impressed on the line 16 and received by the computing circuit 32 of the main station 12.

For reading each digit of the meter reading, nine interrogation pulses are applied to the remote station 13. In the present case of the units place digit of the meter reading being nine, the count in the counter 44 is not reduced to zero until nine interrogation pulses have been applied thereto through the AND gate 46. Thus, all nine interrogation pulses will be gated from the main station 12 over the line 14 through the LED 36, phototransistor 31, AND gate 46 and transistor 47 back to the main station 12 over the line 16. The pulses produced at the collector of the transistor 47 constitute the data pulses. The computing unit 32 counts the data pulses to reconstruct the units place digit of the meter reading and feed the same to the display unit 33 for display. In summary, nine V1 to V2 transistions are applied from the main station 12 to the remote station 13 as interrogation pulses. These pulses are processed by the remote station 13 and returned to the main station 12 as data pulses. Each high to low transition of an interrogation pulse produces a high to low transistion of a data pulse due to the double inversion of the phototransistor 31 and transistor 47.

The counter 41 is adapted to produce one positive output pulse in response to each 9th interrogation pulse. The pulse width of the output pulse of the counter 41 is selected to be longer than the pulse width of the interrogation pulse but shorter than the pulse repetition period thereof. In other words, the leading edges of each 9th interrogation pulse and the output pulse of the counter 41 coincide, but the trailing edge of the output pulse of the counter 41 occurs between the trailing edge of the respective interrogation pulse and the leading edge of the subsequent interrogation pulse.

The leading edge of the output pulse of the counter 41 produced in response to the 9th interrogation pulse causes the counter-decoder 42 to increment and produce a high output on the line $10^1$ which is applied to the movable contact 28f of the tens place switch 28b. In the illustrated example, the movable contact 28f is in engagement with the zero contact of the switch 28b, and a high signal will appear on the line 0.

The trailing edge of the output pulse of the counter 41 is gated through the OR gate 52 to the set input of the counter 44, causing the output of the converter 43 to be set into the counter 44. Since the tens place digit of the meter reading is zero, the binary number 0000 is set into the counter 44. Since the count in the counter 44 is zero, the output of the counter 44 which is connected to the input of the AND gate 46 goes low, inhibiting the AND gate 46. Thus, although the second nine interrogation pulses cycle the counter 41, none are gated through the AND gate 46 to the main station 12. The tens place meter reading is zero, and no data pulses are produced.

The 18th interrogation pulse produces an output pulse from the counter 41 which increments the counter-decoder 42 to produce a high output on the line $10^2$. This selects the movable contact 28g of the hundreds place digit switch 28c. In the illustrated example, the hundreds place digit is two, so binary 0010 is set into the counter 44. The third set of nine interrogation pulses will produce two data pulses, since the counter 44 will be decremented to zero by the second interrogation pulse, inhibiting the AND gate 46 and preventing gating of the third to ninth pulses therethrough.

The 27th interrogation pulse will again produce a pulse output of the counter 41 to increment the counter-decoder 42 and produce a high signal on the line $10^3$. Since the thousands place digit is eight, the binary number 1000 will be set into the counter 44 and eight data pulses produced. It will be noted that the meter reading in this example is 8209, and may represent the consumption of cubic feed of gas, kilowatt hours of electricity, gallons of water or the like.

In summary, four sets of nine interrogation pulses are applied from the main station 12 to the remote station 13 over the lines 14 and 17. In response to the first set of nine pulses, nine data pulses are fed from the remote station 13 to the main station 12 over the lines 16 and 17.

In response to the second, third and fourth sets of nine interrogation pulses, zero, two and eight data pulses respectively are produced.

Various modifications to the apparatus 11 are possible within the scope of the present invention. For example, the counter 44 may be adapted to produce a low output in response to underflow thereof, or a low borrow signal. This borrow output may be connected to the AND gate 46 to inhibit the same as soon as an underflow or borrow operation has occured in the counter 44. In this case, ten rather than nine interrogation pulses would be applied to the remote station 13 for each digit of the meter reading. The number of data pulses produced for each digit would be equal to the value of the digit plus one. For example, if the digit was 5, six data pulses would be produced. Where the digit is zero, one data pulse would be produced. In the latter case, the first interrogation pulse would produce a data pulse. However, the first interrogation pulse would cause underflow of the counter 44 and inhibition of the AND gate 46. Thus, the second to tenth interrogation pulses would not produce data pulses.

Figure 3:
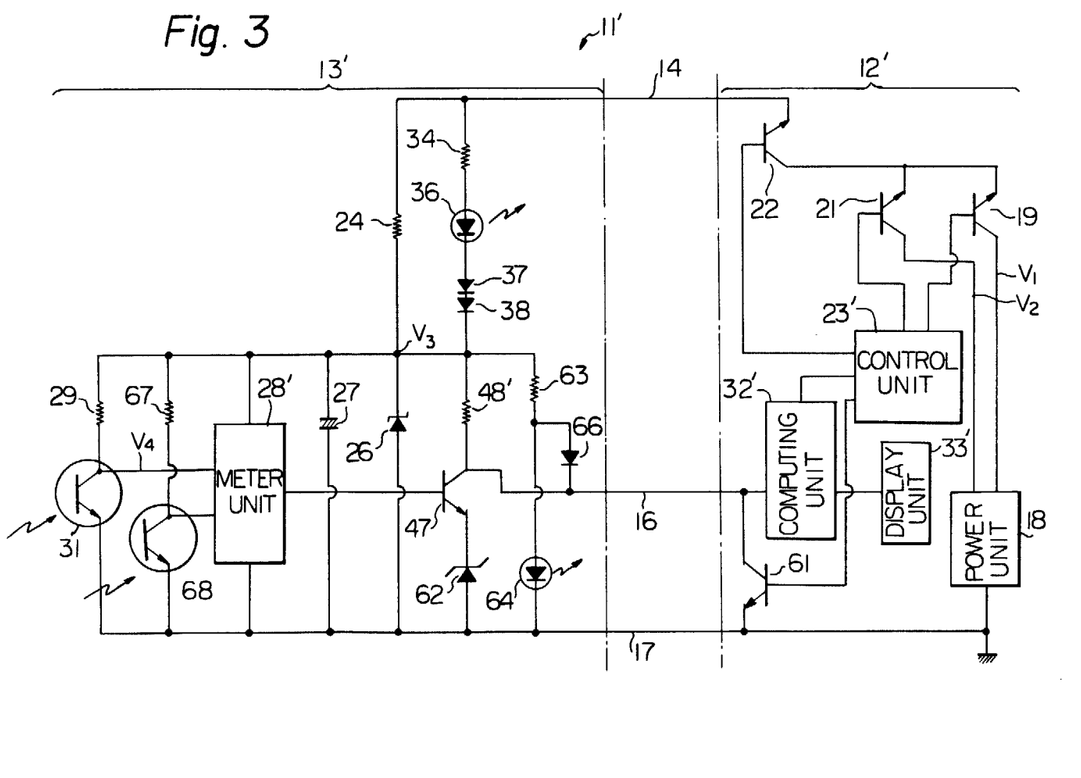
FIG. 3 is similar to FIG. 1 but shows a modified embodiment of the present invention.

FIG. 3 illustrates a modified embodiment of the present invention in which like elements are designated by the same reference numerals and elements which perform similar functions are designated by the same reference numerals primed.

In an apparatus 11', a meter unit 28' is adapted to measure the consumption of two utilities such as electricity and gas. The meter reading for electricity consumption is obtained in the manner described above by applying interrogation pulses to the line 14. However, a different means is provided to obtain the reading for gas consumption.

The apparatus 11' comprises an NPN transistor 61 having its emitter connected to the line 17 and its collector connected to the line 16. The base of the transistor 61 is connected to a control unit 23'. A zener diode 62 connected between the emitter of the transistor 47 and the line 17 provides fixed emitter bias. A resistor 63 and a light emitting diode (LED) 64 are connected in series across the zener diode 26. A reverse blocking diode 66 is connected between the junction of the resistor 63 and LED 64 and the line 16, with the cathode of the diode 66 being connected to the line 16.

In addition, a resistor 67 and an NPN phototransistor 68 are connected in series across the zener diode 26, with the collector of the phototransistor 68 being connected to the meter unit 28'. The LED 64 is optically coupled to the phototransistor 68.

For reading the electricity consumption, the control unit 23' applies a low signal to the transistor 61 turning off the same. The LED 64 emits light continuously, causing the phototransistor 68 to be turned on and produce a low collector voltage. The combination of the zener diode 62 and diode 66 prevent the collector voltage of the transistor 47 from affecting the LED 64.

Figure 5:
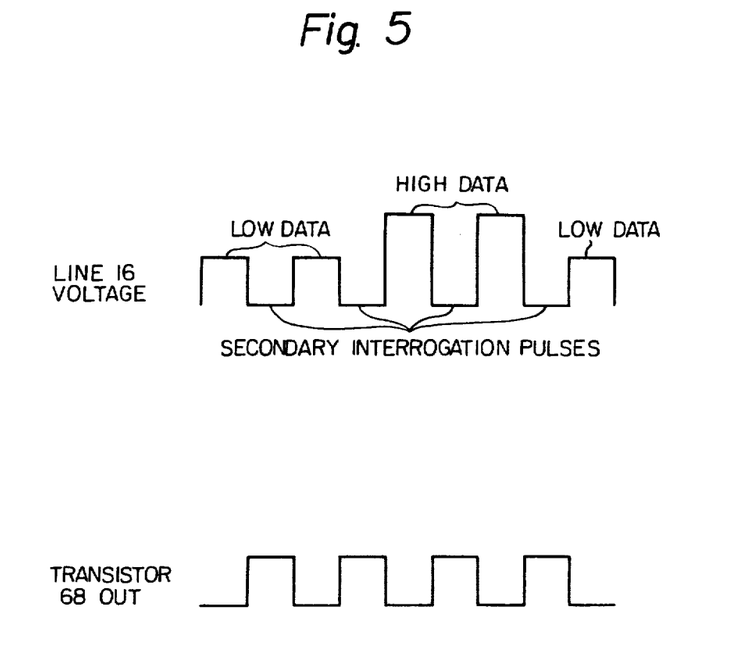
FIG. 5 is a timing diagram illustrating the operation of the additional functions provided in the embodiment of FIG. 3.

To obtain the gas meter reading, as shown in FIG 5, the main station 12' applies secondary interrogation pulses to the remote station 13' by applying positive pulses to the transistor 61. Whenever the base voltage of the transistor 61, applied from the control unit 23', is high, the transistor 61 is turned on and shorts the line 16 to the line 17. Due to conduction through the diode 66, the voltage across the LED 64 drops close to zero and the LED 64 does not emit light. This turns off the phototransistor 68 so that the collector voltage thereof goes high. Removing the high signal from base of the transistor 61 turns off the same, causing the LED 64 to emit light and turn on the phototransistor 68. Thus, the collector voltage of the phototransistor 68 goes low. In this manner, positive pulses applied to the transistor 61 cause positive pulses to be applied to the meter unit 28' from the collector of the phototransistor 68. These pulses may be processed in any known manner by the meter unit 28', which produces and feeds secondary data pulses representing the gas meter reading to the main station 12' over the lines 16 and 17. A typical means for performing this function is disclosed in Japanese Patent Application No. 51-111625 to the present applicant, and may be incorporated herein by reference.

In summary, it will be seen that the present invention overcomes the drawbacks of the prior art and provides a remote data collection apparatus which functions efficiently and reliably, and may utilize mechanical and electronic utility meter modules interchangeably. Various modifications to the present invention not specifically shown and described herein will become possible for those skilled in the art after receiving the teachings of the present disclosure without departing from the scope thereof.

What is claimed is:

1. A data collection apparatus comprising:
   a main station;
   a remote station; and
   first, second and third transmission lines connecting the main station to the remote station;
   the main station being constructed to apply electrical power and interrogation signals to the remote station over the first and third transmission lines, the remote station being constructed to feed data signals to the main station over the second and third transmission lines in response to the interrogation signals;
   the main station being further constructed to apply secondary interrogation signals to the remote station over the second and third transmission lines, the remote station being constructed to feed secondary data signals to the main station over the second and third transmission lines in response to the secondary interrogation signals.

2. An apparatus as in claim 1, in which the main station comprises switch means connected between the second and third transmission lines for producing the secondary interrogation signals by opening and closing of the switch means, the remote station comprising optocoupler means connected to the second and third transmission lines.

3. An apparatus as in claim 2, in which the optocoupler means comprises a resistor connected between the first and second transmission lines, a lamp means connected between the second and third transmission lines and a photosensor means optically coupled to the lamp means.

4. A data collection apparatus comprising:
   a main station;
   a remote station; and
   first, second and third transmission lines connecting the main station to the remote station;
   the main station being constructed to apply electrical power and interrogation signals to the remote station over the first and third transmission lines, the remote station being constructed to feed data signals to the main station over the second and third transmission lines in response to the interrogation signals;

the main station being further constructed to apply the interrogation signals to the remote station as first and second electrical signals of first and second magnitudes respectively;

the remote station further comprising a resistor and a zener diode connected in series between the first and third transmission lines, the first and second magnitudes of the first and second electrical signals being greater than a zener voltage of the zener diode, the remote station further comprising optocoupler means connected in parallel with the resistor.

5. An apparatus as in claim 4, in which the optocoupler means comprises a lamp means and a photosensor means optically coupled to the lamp means, the photosensor means producing third and fourth electrical signals of third and fourth magnitudes in response to the first and second electrical signals respectively.

6. An apparatus as in claim 4, in which the zener voltage of the zener diode constitutes a power supply voltage for the remote station.

7. A data collection apparatus comprising:

a main station;

a remote station; and first, second and third transmission lines connecting the main station to the remote station;

the main station being constructed to apply electrical power and interrogation signals to the remote station over the first and third transmission lines, the remote station being constructed to feed data signals to the main station over the second and third transmission lines in response to the interrogation signals;

the remote station further comprising a meter, the data signals representing a meter reading;

the remote station further comprising a down counter and means for setting the meter reading into the counter, the interrogation signals decrementing the counter, the remote station further comprising gate means controlled by the counter in such a manner as to gate the interrogation signals therethrough as the data signals as long as the count in the counter is greater than zero.

* * * * *